US012664740B2

(12) United States Patent
Yoshida

(10) Patent No.: US 12,664,740 B2
(45) Date of Patent: Jun. 23, 2026

(54) INFORMATION PROCESSING APPARATUS

(71) Applicant: CANON KABUSHIKI KAISHA,
Tokyo (JP)

(72) Inventor: Akimitsu Yoshida, Tokyo (JP)

(73) Assignee: Canon Kabushiki Kaisha, Tokyo (JP)

( * ) Notice: Subject to any disclaimer, the term of this
patent is extended or adjusted under 35
U.S.C. 154(b) by 160 days.

(21) Appl. No.: 18/621,565

(22) Filed: Mar. 29, 2024

(65) Prior Publication Data

US 2024/0355066 A1      Oct. 24, 2024

(30) Foreign Application Priority Data

Apr. 18, 2023    (JP) ................................. 2023-067721

(51) Int. Cl.
    *G06T 19/00*          (2011.01)
    *G06T 7/73*           (2017.01)
(52) U.S. Cl.
    CPC .............. *G06T 19/006* (2013.01); *G06T 7/73*
      (2017.01); *G06T 2207/30196* (2013.01); *G06T*
                              *2207/30204* (2013.01)
(58) Field of Classification Search
    None
    See application file for complete search history.

(56) References Cited

U.S. PATENT DOCUMENTS

| | | | |
|---|---|---|---|
| 12,400,415 B2 * | 8/2025 | Kaku ....................... | G06T 19/20 |
| 2010/0081508 A1 * | 4/2010 | Bhogal ................... | A63F 13/75 |
| | | | 463/40 |
| 2019/0180664 A1 * | 6/2019 | Sun ......................... | G06F 21/84 |
| 2020/0400448 A1 * | 12/2020 | Yanaga .............. | G01C 21/3617 |
| 2024/0007477 A1 | 1/2024 | Shishido | |
| 2024/0087234 A1 * | 3/2024 | Monti ..................... | A63F 13/79 |

FOREIGN PATENT DOCUMENTS

JP          2022-144864 A      10/2022

* cited by examiner

*Primary Examiner* — Tapas Mazumder
(74) *Attorney, Agent, or Firm* — Venable LLP

(57)                ABSTRACT

An information processing apparatus according to the pres-
ent invention includes a processor, and a memory storing a
program which, when executed by the processor, causes the
information processing apparatus to acquire information
regarding a personal space of a second user displayed in a
three-dimensional space viewed by a first user, acquire
information regarding a distance from the first user to a
display position of the second user in the three-dimensional
space, and determine whether to display the second user at
the display position so that the first user does not enter the
personal space, on a basis of the personal space and the
distance.

9 Claims, 10 Drawing Sheets

*FIG. 3*

|  | SHORTEST ALLOWABLE DISTANCE 1 [m] | SHORTEST ALLOWABLE DISTANCE 2 [m] |
|---|---|---|
| PERSON A (LOVER) | 0 | 0 |
| GROUP X (FRIEND) | 0. 5 | 0. 5 |
| GROUP Y (ACQUAINTANCE) | 1. 2 | 1. 2 |
| PERSON B | 0. 5 | 0. 5 |
| PERSON C | 0. 5 | 1. 2 |
| PERSON D | 1. 2 | 0. 5 |
| … | … | … |
| OTHERS | 2. 5 | 2. 5 |

*FIG. 7*

*FIG. 8A*
*FIG. 8B*
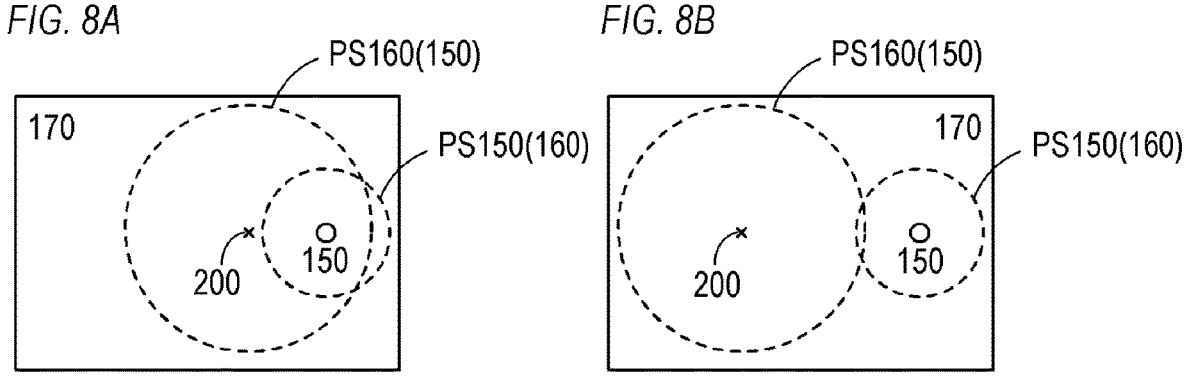
*FIG. 8C*
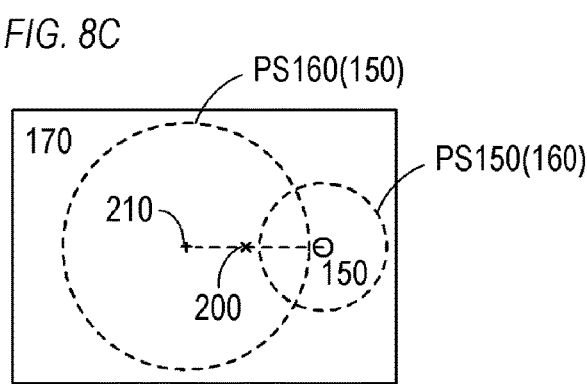

INFORMATION PROCESSING APPARATUS

BACKGROUND OF THE INVENTION

Field of the Invention

The present invention relates to an information processing apparatus, and in particular, to a mixed reality image display.

Description of the Related Art

Mixed reality (MR) technology is known as a technology for seamlessly merging a real world with a virtual world in real time. The MR technology may be used in video see-through head-mounted displays (HMDs). When a video see-through HMD is used, for example, an image of a range corresponding to the field of view of a user wearing the HMD in a real space is captured by a video camera. Computer graphics (CG) is then combined with the image (video) of the real space acquired by the video camera, and a composite image (the image obtained by combining the CG with the real space image) is displayed on a display panel provided on the inside of the HMD. When viewing the composite image displayed on the display panel, the user can feel as if virtual objects created by CG actually exist in the real space.

Japanese Patent Application Publication No. 2022-144864 discloses a technique of changing a display mode of an avatar according to a distance between avatars in a virtual space.

In a case where a plurality of persons communicate in the real world, it is important to set a distance between the plurality of persons at which each person does not feel uncomfortable. A range (region) in which a person feels uncomfortable when being intruded by another person is called a personal space. Even in a case where a plurality of persons communicate in a virtual world (including a mixed real world in which the real world and the virtual world are merged), it is considered that it is important that intrusion into a personal space (invasion of the personal space) does not occur similarly to the real world. In particular, as the reality of the virtual world increases due to advances in technology, the importance of not invading the personal space also increases.

However, in the prior art (for example, the technique disclosed in Japanese Patent Application Publication No. 2022-144864), it is not possible to suppress the intrusion into the personal space in the virtual world. In the technique disclosed in Japanese Patent Application Publication No. 2022-144864, since the reality of communication is reduced due to the change in the display mode of the avatar, there is a possibility that a sense of discomfort is generated in the communication.

SUMMARY OF THE INVENTION

The present invention provides a technique capable of suppressing intrusion into a personal space in a virtual world.

The present invention in its first aspect provides an information processing apparatus including a processor, and a memory storing a program which, when executed by the processor, causes the information processing apparatus to acquire information regarding a personal space of a second user displayed in a three-dimensional space viewed by a first user, acquire information regarding a distance from the first user to a display position of the second user in the three-dimensional space, and determine whether to display the second user at the display position so that the first user does not enter the personal space, on a basis of the personal space and the distance.

The present invention in its second aspect provides an information processing method including acquiring information regarding a personal space of a second user displayed in a three-dimensional space viewed by a first user, acquiring information regarding a distance from the first user to a display position of the second user in the three-dimensional space, and determining whether to display the second user at the display position so that the first user does not enter the personal space, on a basis of the personal space and the distance.

The present invention in its third aspect provides a non-transitory computer readable medium that stores a program, wherein the program causes a computer to execute an information processing method including acquiring information regarding a personal space of a second user displayed in a three-dimensional space viewed by a first user, acquiring information regarding a distance from the first user to a display position of the second user in the three-dimensional space, and determining whether to display the second user at the display position so that the first user does not enter the personal space, on a basis of the personal space and the distance.

Further features of the present invention will become apparent from the following description of exemplary embodiments with reference to the attached drawings.

BRIEF DESCRIPTION OF THE DRAWINGS

FIG. 3 is a diagram illustrating personal space information according to the first embodiment;

FIG. 7 is a flowchart illustrating guest-side display processing according to the first embodiment;

FIGS. 8A to 8C are schematic diagrams illustrating personal space and the like according to the first embodiment;

DESCRIPTION OF THE EMBODIMENTS

First Embodiment

Figure 1:
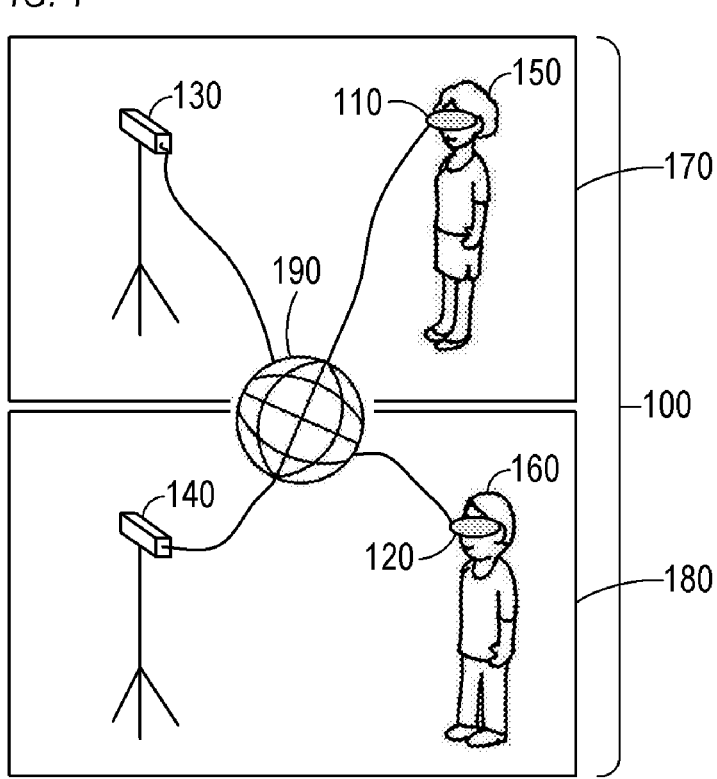
FIG. 1 is a schematic diagram illustrating a configuration of an information processing system according to a first embodiment.
Figure 2:
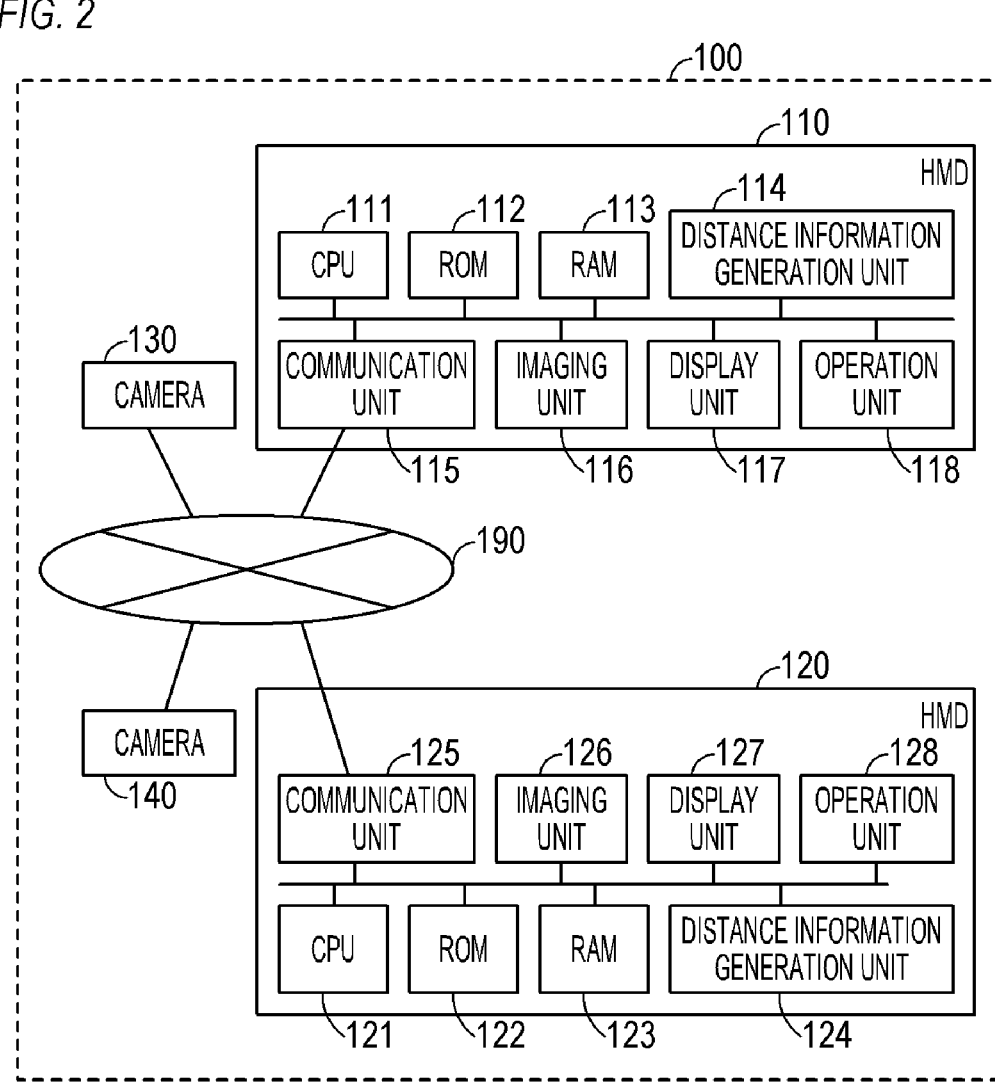
FIG. 2 is a block diagram illustrating a configuration of the information processing system according to the first embodiment.

Hereinafter, a first embodiment of the present invention will be described. FIG. 1 is a schematic diagram illustrating a configuration example of an information processing system 100 according to the first embodiment. FIG. 2 is a block diagram illustrating a configuration example of the information processing system 100. The information processing system 100 includes a head-mounted display (HMD) 110, an HMD 120, a camera 130, and a camera 140. The HMD 110, the HMD 120, the camera 130, and the camera 140 are connected to a network 190 and can communicate with each other via the network 190. A space 170 (for example, a room of a person 150) in which the person 150, who is a user of the HMD 110, is present is different from a space 180 (for example, a room of a person 160) in which the person 160, who is a user of the HMD 120, is present. The person 150 wears the HMD 110 on the head, and the person 160 wears the HMD 120 on the head. The camera 130 is placed in the space 170 where the person 150 is present, and the camera 140 is placed in the space 180 where the person 160 is present.

The HMD 110 includes a CPU 111, a ROM 112, a RAM 113, a distance information generation unit 114, a communication unit 115, an imaging unit 116, a display unit 117, and an operation unit 118. The CPU 111 is an arithmetic device that controls the entire HMD 110 and performs various kinds of processing by executing various programs stored in the ROM 112, for example. The ROM 112 is read-only non-volatile memory that stores various kinds of information (for example, various programs and various parameters). In the first embodiment, the ROM 112 also stores information regarding the personal space of the person 150 (personal space information of the person 150). The personal space information will be described later. The RAM 113 is a memory that temporarily stores various pieces of information and is also used as a work memory of the CPU 111. The distance information generation unit 114 acquires information (distance information) regarding the distance between a position of a marker set in the space 170 and the HMD 110. The communication unit 115 performs wire or wireless communication with an external device. The imaging unit 116 acquires a field-of-view image representing a range (in front of the HMD 110) corresponding to the field of view of the person 150 wearing the HMD 110 in a real space by capturing an image of the range. The imaging unit 116 includes, for example, an imaging sensor such as a CCD sensor or a CMOS sensor. The display unit 117 can display various images and various kinds of information. The display unit 117 includes, for example, a display panel such as a liquid crystal panel or an organic EL panel. The person 150 can view an image (video) displayed on the display unit 117 by wearing the HMD 110. The HMD 110 is a video see-through HMD and the CPU 111 can display the field-of-view image acquired by the imaging unit 116 on the display unit 117. The operation unit 118 receives various operations by the person 150.

The HMD 120 includes a CPU 121, a ROM 122, a RAM 123, a distance information generation unit 124, a communication unit 125, an imaging unit 126, a display unit 127, and an operation unit 128. The HMD 120 has a configuration similar to that of the HMD 110.

The camera 130 is an imaging device that acquires a space image representing at least a part of the space 170 by capturing an image of the person 150 (the space 170 in which the person 150 is present). The camera 130 transmits the space image of the space 170 to the HMD 120 via the network 190. In the HMD 120, the region of the person 150 is extracted from the space image of the space 170 by the control of the CPU 121. As a result, a person image, which is an image (an image representing only the person 150) acquired by capturing the person 150, is obtained. Furthermore, the person 150 is erased from the space image of the space 170 using a diminished reality (DR) technology. Then, the person image of the person 150 is combined with the space image of the space 170 from which the person 150 has been erased, and the composite image (image obtained by combining the person image of the person 150 with the space image of the space 170 from which the person 150 has been erased) is displayed on the display unit 117. By viewing the image displayed on the display unit 127, the person 160 can feel as if the person 160 is in the same space 170 as the person 150.

The camera 140 is an imaging device that acquires a space image representing at least a part of the space 180 by capturing an image of the person 160 (the space 180 in which the person 160 is present). The camera 140 transmits the space image of the space 180 to the HMD 110 via the network 190. In the HMD 110, the region of the person 160 is extracted from the space image of the space 180 by the control of the CPU 111. As a result, a person image, which is an image (an image representing only the person 160) acquired by capturing the person 160, is obtained. Next, the person image of the person 160 is combined with the field-of-view image (the field-of-view image of the person 150) acquired by the imaging unit 116, and the composite image (the image obtained by combining the person image of the person 160 with the field-of-view image of the person 150) is displayed on the display unit 117. By viewing the image displayed on the display unit 117, the person 150 can feel as if the person 160 is in the same space 170 as the person 150.

The person 150 can designate a display position of the person 160 (a composite position of the person images of the person 160) using the operation unit 118. When the composite position of the person 160 is designated, a marker is displayed at the composite position. The distance information acquired by the distance information generation unit 114 is information regarding the distance between the position of the marker and the HMD 110. The distance between the position of the marker and the HMD 110 can also be interpreted as the distance from the person 150 to the composite position of the person 160 in the space 170 (three-dimensional space) viewed by the person 150. Similarly, the person 160 can designate a display position of the person 150 (a composite position of the person images of the person 150) using the operation unit 128.

According to the operation described above, the person 160 is invited to the space 170 where the person 150 is present. Thus, the space 170 in which the person 150 is present can be regarded as a host side, and the space 180 where the person 160 is present can be regarded as a guest side.

While each of the cameras 130 and 140 may be a monocular camera, it is preferable that the cameras 130 and 140 be a stereo camera. When the camera 130 is a stereo camera, the person 150 wearing the HMD 110 can stereoscopically view two images having a parallax so that the person 150 can obtain a higher sense of immersion. Similarly, when the camera 140 is a stereo camera, the person 160 wearing the HMD 120 can stereoscopically view two images having a parallax so that the person 160 can obtain a higher sense of immersion.

In addition, it is preferable that the host-side camera 130 have a wide imaging range. For example, the viewing angle (angle of view) may be a range of 180 degrees or a range of 360 degrees. The image acquired by the host-side camera 130 may be a hemispherical image (a VR180 image), a spherical omnidirectional image (an omnidirectional image), or a panoramic image. Since the host-side camera 130 has a wide imaging range, the guest-side person 160 can view the image of the host-side space 170 even when significantly changing the orientation of the face. Therefore, the guest-side person 160 can feel as if the guest-side person 160 is in the host-side space 170.

FIG. 3 is a diagram illustrating an example of the personal space information of the person 150 stored in the ROM 112 of the HMD 110. For example, predetermined personal space information is stored in the ROM 112 at the time of manufacturing the HMD 110. Then, when the person 150 instructs to update the personal space information using the operation unit 118, the CPU 111 updates the personal space information stored in the ROM 112. The personal space information in FIG. 3 indicates a shortest allowable distance 1 and a shortest allowable distance 2. The shortest allowable distance 1 is the lower limit of the distance between the person 150 and another person when the person 150 approaches another person. The shortest allowable distance 2 is the lower limit of the distance between the person 150 and another person when another person approaches the person 150. The personal space of the person 150 is a range (region) in which the person 150 feels uncomfortable when being intruded by another person. An area within a circle centered on the person 150 and having the shortest allowable distance 1 as a radius is a personal space of the person 150. An area within a circle centered on the person 150 and having the shortest allowable distance 2 as a radius is also a personal space of the person 150.

The personal space information in FIG. 3 indicates a plurality of combinations of the shortest allowable distance 1 and the shortest allowable distance 2. Each combination is associated with a group or person. For example, considering that the person 150 may approach a person C but does not want to be approached by the person C, the shortest allowable distance 1 of 0.5 m and the shortest allowable distance 2 of 1.2 m are set for the person C. According to the shortest allowable distances 1 and 2, the person 150 approaches person C to a distance of 0.5 m from the person C, but the person C needs to be separated from the person 150 by 1.2 m or more. Further, considering that the person 150 does not want to approach the person D but may be approached by the person D, a distance longer than the shortest allowable distance 2 is set as the shortest allowable distance 1 for the person D.

Note that the distance between persons is uniquely determined in the real world, but in the first embodiment, the distance between persons in the virtual world (including a mixed real world in which the real world and the virtual world are merged) is not uniquely determined. For example, since the composite position of the person 150 and the composite position of the person 160 are individually set, the sense of distance to the person 160 (composite position of the person 160) obtained by the person 150 and the sense of distance to the person 150 (composite position of the person 150) obtained by the person 160 may be different from each other.

Similarly to the ROM 112 of the HMD 110, the ROM 122 of the HMD 120 stores information indicating the shortest allowable distance 1 and the shortest allowable distance 2 as the personal space information of the person 160.

Figure 4:
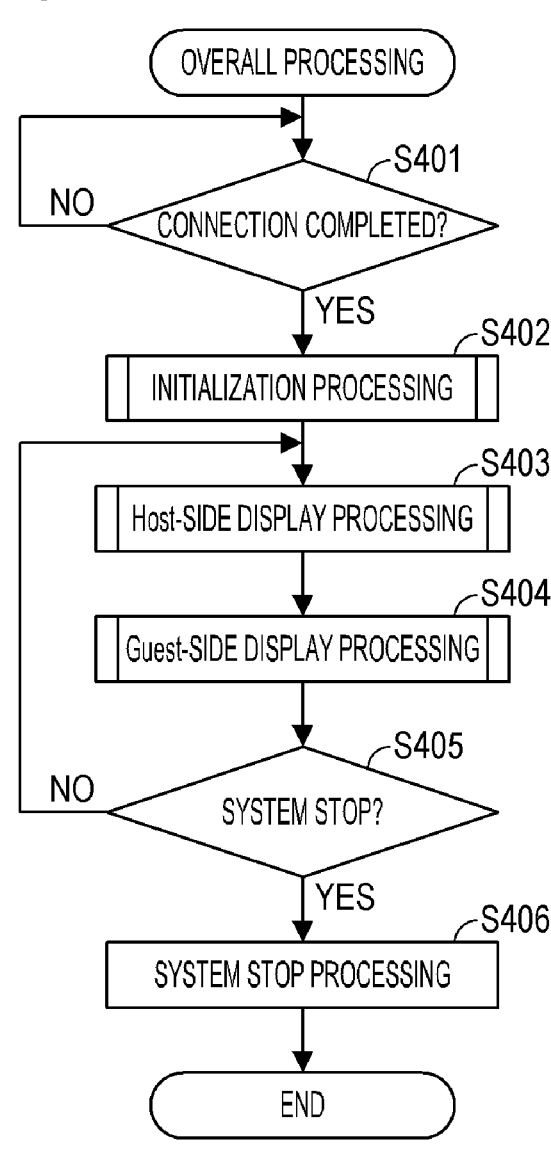
FIG. 4 is a flowchart illustrating overall processing according to the first embodiment.

FIG. 4 is a flowchart illustrating an example of overall processing performed by the information processing system 100. For example, when the information processing system 100 (the host-side HMD 110, the guest-side HMD 120, the host-side camera 130, and the guest-side camera 140) is activated, the overall processing in FIG. 4 is started.

In S401, the CPU 111 of the host-side HMD 110 determines whether the host-side HMD 110, the guest-side HMD 120, the host-side camera 130, and the guest-side camera 140 are connected to each other (via the network 190). The CPU 111 stands by until it is determined that these four devices are connected to each other, and when it is determined that the four devices are connected to each other, the CPU 111 performs the processing in S402.

In S401, the CPU 121 of the guest-side HMD 120 also determines whether the above four devices are connected to each other. The CPU 121 stands by until it is determined that the four devices are connected to each other, and when it is determined that the four devices are connected to each other, the CPU 121 performs the processing in S402.

In S402, the CPU 111 of the host-side HMD 110 performs initialization processing. The CPU 121 of the guest-side HMD 120 also performs initialization processing. Details of the initialization processing will be described later with reference to FIG. 5.

In S403, the CPU 111 of the host-side HMD 110 performs host-side display processing. Details of the host-side display processing will be described below with reference to FIG. 6.

In S404, the CPU 121 of the guest-side HMD 120 performs guest-side display processing. Details of the guest-side display processing will be described below with reference to FIG. 7. In the example of FIG. 4, the guest-side display processing is performed after the host-side display processing, but the guest-side display processing may be performed before the host-side display processing or may be performed in parallel with the host-side display processing.

In S405, the CPU 111 of the host-side HMD 110 determines whether to stop the information processing system 100. The CPU 111 repeatedly performs the host-side display processing (S403) per frame until it is determined to stop the information processing system 100, and performs the processing of S406 when it is determined to stop the information processing system 100. For example, when the host-side person 150 requests a system stop using the operation unit 118 of the host-side HMD 110, the CPU 111 determines to stop the information processing system 100.

In S405, the CPU 121 of the guest-side HMD 120 also determines whether to stop the information processing system 100. The CPU 121 repeatedly performs the guest-side display processing (S404) per frame until it is determined to stop the information processing system 100, and performs the processing of S406 when it is determined to stop the information processing system 100. For example, when the guest-side person 160 requests a system stop using the operation unit 128 of the guest-side HMD 120, the CPU 121 determines to stop the information processing system 100.

In S406, the CPU 111 of the host-side HMD 110 performs system stop processing. The CPU 121 of the guest-side HMD 120 also performs the system stop processing. The system stop processing includes, for example, a process of disconnecting from the network 190. Since the host-side person 150 and the guest-side person 160 communicate with each other, the impression that the host-side person 150 has on the guest-side person 160 is changed, or the impression that the guest-side person 160 has on the host-side person 150 is changed. Therefore, the system stop processing may include personal space information update processing. For example, the CPU 111 notifies (for example, display of personal space information update screen) the host-side person 150 to urge the update of the personal space information of the host-side person 150. Then, in response to an instruction from the host-side person 150, the CPU 111 updates the personal space information of the host-side person 150 stored in the ROM 112 of the host-side HMD 110. Similarly, the CPU 121 notifies the guest-side person 160 to urge the update of the personal space information of the guest-side person 160. Then, in response to an instruction from the guest-side person 160, the CPU 121 updates the personal space information of the guest-side person 160 stored in the ROM 122 of the guest-side HMD 120. The updated personal space information is used in the next entire processing (for example, initialization processing). Note that the timing of the personal space information update processing is not particularly limited, and for example, the personal space information update processing may be performed before the entire processing illustrated in FIG. 4 starts.

Figure 5:
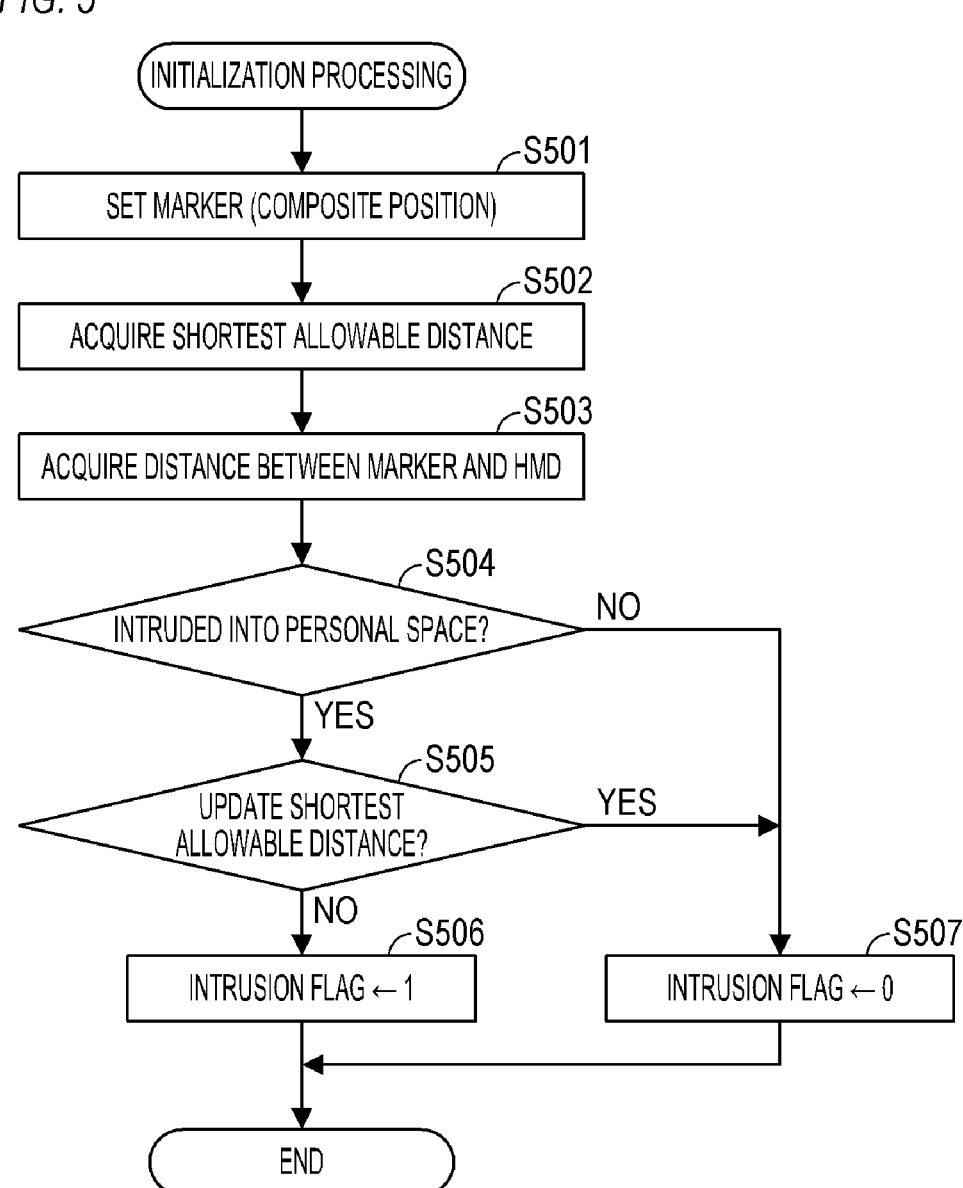
FIG. 5 is a flowchart illustrating initialization processing according to the first embodiment.

FIG. 5 is a flowchart illustrating an example of the initialization processing (S402 in FIG. 4).

In S501, the CPU 111 of the host-side HMD 110 sets the composite position of the guest-side person 160 in the host-side space 170 in response to an instruction from the host-side person 150. At this time, the field-of-view image (the field-of-view image of the host-side person 150) acquired by the imaging unit 116 of the host-side HMD 110 is displayed on the display unit 117 of the host-side HMD 110. While viewing the field-of-view image of the host-side person 150, the host-side person 150 designates a position in the field-of-view image as the composite position of the guest-side person 160 using the operation unit 118 of the host-side HMD 110. When the composite position of the guest-side person 160 is designated, the CPU 111 displays a marker at the designated composite position. Note that there may be a physical mark in the host-side space 170, and the position of the mark may be detected and set as the composite position of the guest-side person 160.

In addition, in S501, the CPU 121 of the guest-side HMD 120 sets the composite position of the host-side person 150 in the host-side space 170 in response to an instruction from the guest-side person 160. At this time, the guest-side HMD 120 receives the space image (space image of the host-side space 170) obtained by the host-side camera 130. Then, the display unit 127 of the guest-side HMD 120 displays a space image of the host-side space 170 (a space image of the host-side space 170 after the host-side person 150 is erased). While viewing the space image of the host-side space 170, the guest-side person 160 designates a position in the space image as a composite position of the host-side person 150 using the operation unit 128 of the guest-side HMD 120. When the composite position of the host-side person 150 is designated, the CPU 121 displays a marker at the designated composite position.

In S502, the CPU 111 of the host-side HMD 110 reads the shortest allowable distance 1 of the host-side person 150 to the guest-side person 160 from the ROM 112 of the host-side HMD 110. Further, the CPU 111 reads the shortest allowable distance 2 of the guest-side person 160 to the host-side person 150 from the guest-side HMD 120 via the communication unit 115 of the host-side HMD 110 and the communication unit 125 of the guest-side HMD 120. This process can be interpreted as a process in which the CPU 111 of the host-side HMD 110 acquires the personal space information output from the guest-side HMD 120 to the outside. One of the read shortest allowable distances 1 and 2 is used for determining whether or not intrusion into the personal space occurs (intrusion determination). In the first embodiment, it is assumed that the longer one of the read shortest allowable distances 1 and 2 is used for the intrusion determination. Both the shortest allowable distances 1 and 2 acquired here are distances related to display on the host-side HMD 110, and are the lower limit of the distance between the host-side person 150 and the guest-side person 160 when the host-side person 150 approaches the guest-side person 160.

In addition, in S502, the CPU 121 of the guest-side HMD 120 performs the processing in which the "host-side" of the above-described processing of the host-side HMD 110 is replaced with the "guest-side" and the "guest-side" is replaced with the "host-side".

In S503, the CPU 111 of the host-side HMD 110 controls the distance information generation unit 114 of the host-side HMD 110 to acquire the distance between the position of the marker displayed in the host-side space 170 in S501 and the host-side HMD 110. Further, in S503, the CPU 121 of the guest-side HMD 120 controls the distance information generation unit 124 of the guest-side HMD 120 to acquire the distance between the position of the marker displayed in the host-side space 170 in S501 and the guest-side HMD 120.

In S504, the CPU 111 of the host-side HMD 110 determines whether or not intrusion into the personal space occurs on the basis of the shortest allowable distance (personal space) acquired in S502 and the distance acquired in S503. When the distance acquired in S503 is shorter than the shortest allowable distance acquired in S502, the CPU 111 determines that intrusion into the personal space occurs. When the distance acquired in S503 is equal to or longer than the shortest allowable distance acquired in S502, the CPU 111 determines that no intrusion into the personal space occurs. When it is determined that the intrusion into the personal space occurs, the CPU 111 performs the processing of S505, and when it is determined that no intrusion into the personal space occur, the CPU performs the processing of S507.

In S505, the CPU 111 of the host-side HMD 110 inquires of the guest-side person 160 whether or not intrusion into the personal space occurs. For example, the CPU 111 displays a confirmation screen as to whether or not to shorten the shortest allowable distance to the distance acquired in S503 on the display unit 127 of the guest-side HMD 120 via the communication unit 115 of the host-side HMD 110 and the communication unit 125 of the guest-side HMD 120. When the guest-side person 160 allows the intrusion into the personal space (change of the shortest allowable distance), the CPU 111 changes the shortest allowable distance, determines again that the intrusion into the personal space does not occur, and performs the processing of S507. When the guest-side person 160 refuses the intrusion into the personal space (change of the shortest allowable distance), the CPU 111 maintains the determination result that the intrusion into the personal space occurs, and performs the processing of S506.

Note that the processing of S505 may be omitted, but if the processing of S505 is omitted, the host-side person 150 and the guest-side person 160 may not suitably communicate in a case where appropriate personal space information is not set. For example, if a long distance is set as the shortest allowable distance even though the host-side person 150 and the guest-side person 160 are close to each other, it is easy to determine that intrusion into the personal space (invasion of the personal space) has occurred. As a result, the processing of S506 is easily performed. As a result, the host-side person 150 and the guest-side person 160 cannot suitably communicate with each other. The operation when the processing of S506 is performed will be described later. By performing the processing of S505, the occurrence of such a situation can be suppressed.

In addition, the processing of S505 may be changed depending on whether the shortest allowable distance 1 read from the ROM 112 of the host-side HMD 110 or the shortest allowable distance 2 read from the guest-side HMD 120 is used in the personal space intrusion determination (S504).

For example, since the shortest allowable distance 1 read from the ROM 112 of the host-side HMD 110 indicates the personal space of the host-side person 150, an inquiry may be made to the host-side person 150 when the shortest allowable distance 1 is used for intrusion determination. Since the shortest allowable distance 2 read from the guest-side HMD 120 indicates the personal space of the guest-side person 160, an inquiry may be made to the guest-side person 160 when the shortest allowable distance 2 is used for intrusion determination.

In S506, the CPU 111 of the host-side HMD 110 sets the intrusion flag to 1.

In S507, the CPU 111 of the host-side HMD 110 sets the intrusion flag to 0.

In addition, in S504 to S507, the CPU 121 of the guest-side HMD 120 performs the processing in which the "host-side" of the above-described processing of the host-side HMD 110 is replaced with the "guest-side" and the "guest-side" is replaced with the "host-side".

A specific example of the personal space intrusion determination (S504) will be described with reference to FIGS. 8A and 8B. A circle PS150 (160) centered on the host-side person 150 is a circle having a radius of the shortest allowable distance 1 of the host-side person 150 with respect to the guest-side person 160, and indicates a personal space of the host-side person 150 with respect to the guest-side person 160. The position of the marker 200 is the composite position of the guest-side person 160. A circle PS160 (150) centered on the marker 200 is a circle having a radius of the shortest allowable distance 2 of the guest-side person 160 with respect to the host-side person 150, and indicates a personal space of the guest-side person 160 with respect to the host-side person 150. In FIG. 8A, since the host-side person 150 exists in the circle PS160 (150), it is determined that the intrusion into the personal space occurs (the host-side person 150 intrudes into the personal space of the guest-side person 160). In FIG. 8B, since the host-side person 150 does not exist in the circle PS160 (150) and the marker 200 does not exist in the circle PS150 (160), it is determined that the intrusion into the personal space does not occur.

Figure 6:
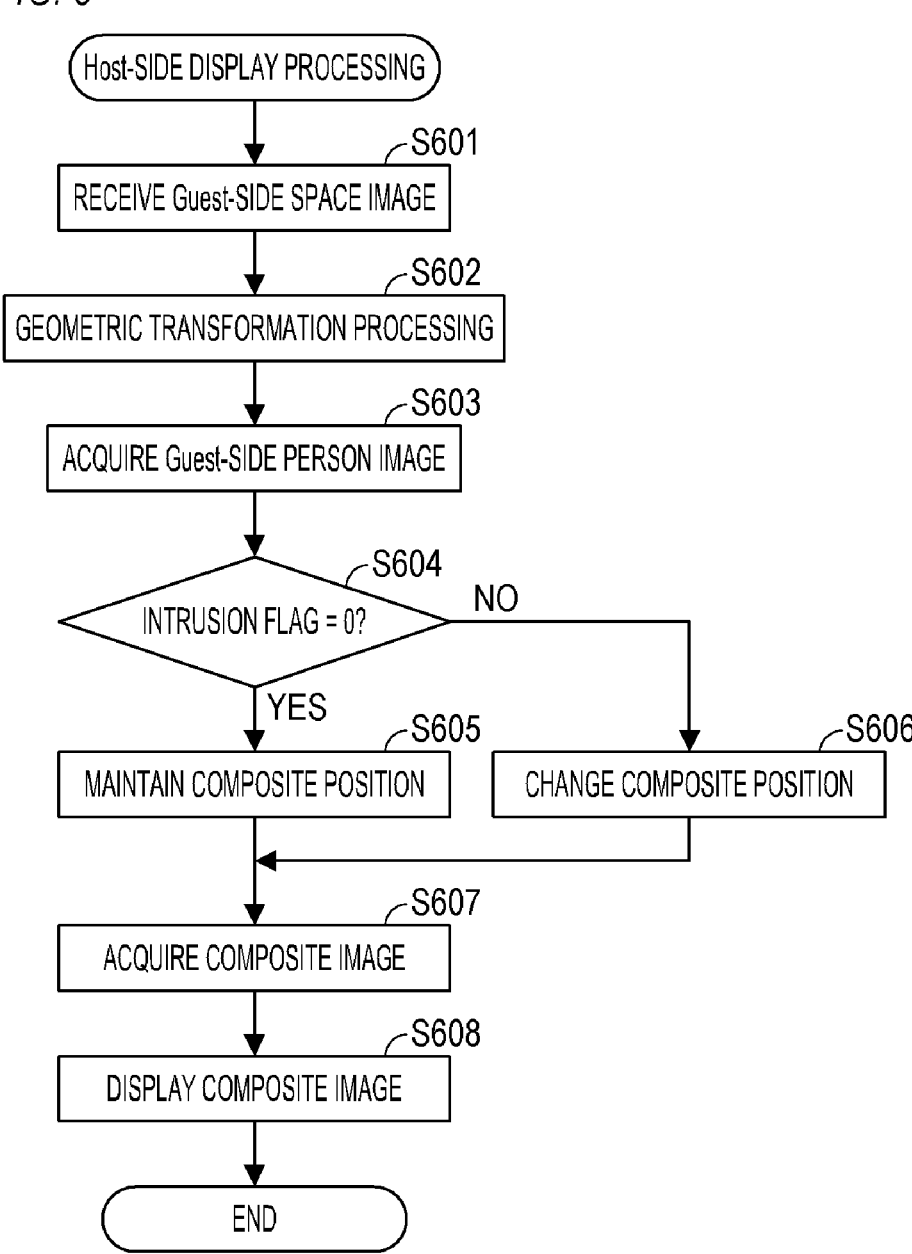
FIG. 6 is a flowchart illustrating host-side display processing according to the first embodiment.

FIG. 6 is a flowchart illustrating an example of the host-side display processing (S403 in FIG. 4). The host-side display processing is performed by the CPU 111 of the host-side HMD 110.

In S601, the CPU 111 receives (acquires) a space image of the guest-side space 180 from the guest-side camera 140 by using the communication unit 115. If a part of the guest-side person 160 is not captured in the space image of the guest-side space 180, a composite image that causes a sense of incongruity (an unnatural composite image in which a part of the guest-side person 160 is not rendered) may be obtained. Therefore, it is preferable that the whole body of the guest-side person 160 be captured in the space image of the guest-side space 180.

In S602, the CPU 111 performs geometric transformation processing on the space image acquired in S601 as needed. For example, when the guest-side camera 140 performs image capturing using a super wide-angle lens such as a fisheye lens, the CPU 111 needs to perform geometric transformation processing such as equirectangular projection transformation to obtain a space image suitable for composition.

In S603, the CPU 111 extracts the region of the guest-side person 160, which is a main object, from the space image acquired in S601 (the space image on which the geometric transformation processing in S602 has been performed). As a result, a person image that is an image acquired by capturing the guest-side person 160 (the image representing only the guest-side person 160) is obtained. The method for extracting the region of the guest-side person 160 is not particularly limited. For example, the image of the guest-side person 160 may be captured in green back, and the region of the guest-side person 160 may be extracted by chroma key processing. The region of the guest-side person 160 may be extracted by using an operator (trained models) trained by machine learning such as deep learning. The extraction method is selected in view of system resources and extraction accuracy.

In S604, the CPU 111 determines whether or not the intrusion flag set in the host-side HMD 110 is 0. When it is determined that an intrusion flag is 0, the CPU 111 performs the processing of S605, and when it is determined that the intrusion flag is not 0 (the intrusion flag is 1), the CPU performs the processing of S606. That is, when it is determined that the intrusion into the personal space does not occur (even if the person image of the person 160 is combined at the position of the marker set in the HMD 110, the personal spaces of the persons 150 and 160 are not violated), the processing of S605 is performed. When it is determined that the intrusion into the personal space occurs (if the person image of the person 160 is combined at the position of the marker set in the HMD 110, the personal space of at least one of the person 150 and the person 160 is violated), the processing of S606 is performed.

In S605, the CPU 111 confirms the position of the marker set in S501 of FIG. 5 as the composite position of the guest-side person 160.

In S606, the CPU 111 changes the composite position of the guest-side person 160 from the set position of the marker to a position where intrusion into the personal space does not occur (even if the person image of the person 160 is combined, the personal spaces of the persons 150 and 160 are not violated). The case of the situation of FIG. 8A is considered. In this case, for example, as illustrated in FIG. 8C, a new composite position 210 (final composite position) is set on a straight line passing through the position of the host-side person 150 and the position of the marker 200. The composite position 210 is not included in the circle PS150 (160), and the host-side person 150 is not included in the circle PS150 (160) centered on the composite position 210. That is, if the composite position 210 is adopted, the personal spaces of the persons 150 and 160 are not violated.

In S607, the CPU 111 combines the person image acquired in S603 with the field-of-view image (the field-of-view image of the host-side person 150) obtained by the imaging unit 116 of the host-side HMD 110. The person image is combined at the composite position determined in S605 or S606. As a result, a composite image in which the guest-side person 160 appears to be in the host-side space 170 is obtained.

In S608, the CPU 111 displays the composite image obtained in S607 on the display unit 117.

Figure 7:
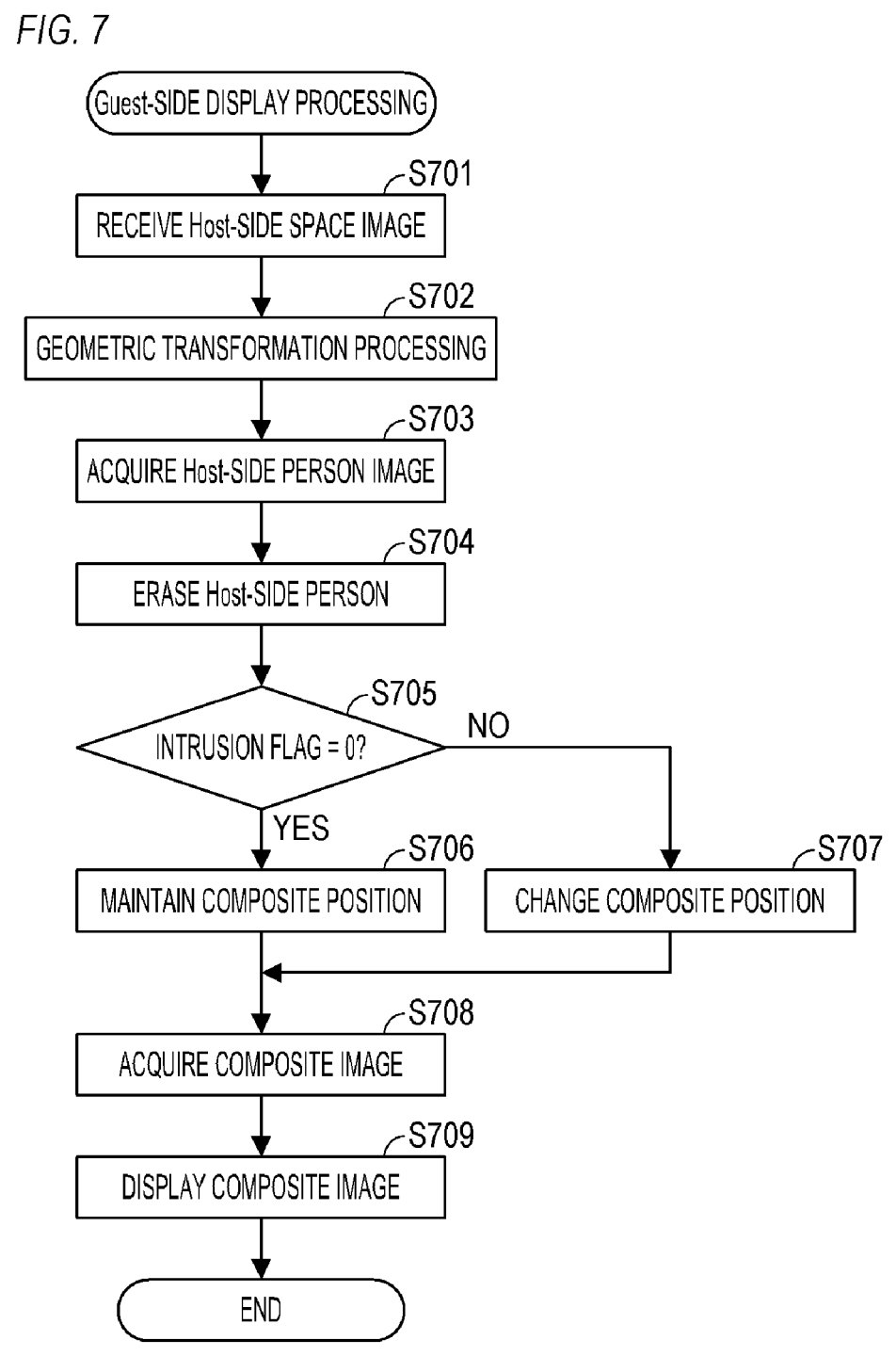

FIG. 7 is a flowchart illustrating an example of the guest-side display processing (S404 in FIG. 4). The guest-side display processing is performed by the CPU 121 of the guest-side HMD 120.

In S701, the CPU 121 receives (acquires) the space image of the host-side space 170 from the host-side camera 130 by using the communication unit 125.

In S702, the CPU 121 performs geometric transformation processing on the space image acquired in S701 as needed. For example, when the host-side camera 130 is a wide-angle stereo camera, the CPU 121 needs to perform geometric transformation processing such as equirectangular projection transformation and perspective projection transformation so as to obtain a space image suitable for stereoscopic viewing.

In S703, the CPU 121 extracts the region of the host-side person 150, which is a main object, from the space image acquired in S701 (the space image on which the geometric transformation processing in S702 has been performed). As a result, a person image that is an image acquired by capturing the host-side person 150 (the image representing only the host-side person 150) is obtained.

In S704, the CPU 121 erases the host-side person 150 from the space image acquired in S701 (the space image on which the geometric transformation processing in S702 has been performed) using the DR technology. As a result, a space image representing the host-side space 170 in which the host-side person 150 does not exist is obtained.

In S705, the CPU 121 confirms whether or not the intrusion flag set in the guest-side HMD 120 is 0. When it is determined that the intrusion flag is 0, the CPU 121 performs the processing of S706, and when it is determined that the intrusion flag is not 0 (the intrusion flag is 1), the CPU performs the processing of S707.

In S706, the CPU 121 determines the position of the marker set in S501 of FIG. 5 as the composite position of the host-side person 150.

In S707, the CPU 121 changes the composite position of the host-side person 150 from the set position of the marker to a position where intrusion into the personal space does not occur (even if the person image of the person 160 is combined, the personal spaces of the persons 150 and 160 are not violated).

In S708, the CPU 121 combines the person image acquired in S703 with the space image acquired in S704. The person image is combined at the composite position determined in S706 or S707. As a result, a composite image in which the host-side person 150 appears to be in the host-side space 170 is obtained.

In S709, the CPU 121 displays the composite image acquired in S708 on the display unit 127.

According to the first embodiment, the information regarding the personal space of a second user displayed in the three-dimensional space viewed by a first user and the information regarding the distance from the first user to the display position of the second user in the three-dimensional space are acquired. Then, on the basis of these pieces of information, it is determined whether or not to display the second user at the set display position so that the first user does not enter the personal space of the second user. For example, in a case where the distance from the first user to the display position of the second user is shorter than the shortest allowable distance of the second user, the display position is changed such that the distance from the first user to the display position of the second user is equal to or longer than the shortest allowable distance of the second user. By doing so, it is possible to suppress intrusion into a personal space in a virtual world.

Note that the example in which the longer one of the shortest allowable distance 1 and the shortest allowable distance 2 is used for the personal space intrusion determination (S504 in FIG. 5) in consideration of both the shortest allowable distance 1 and the shortest allowable distance 2 has been described, but the present invention is not limited thereto. Only the shortest allowable distance 1 may be used for intrusion determination, only the shortest allowable distance 2 may be used for intrusion determination, or both the shortest allowable distance 1 and the shortest allowable distance 2 may be used for intrusion determination.

Figure 9:
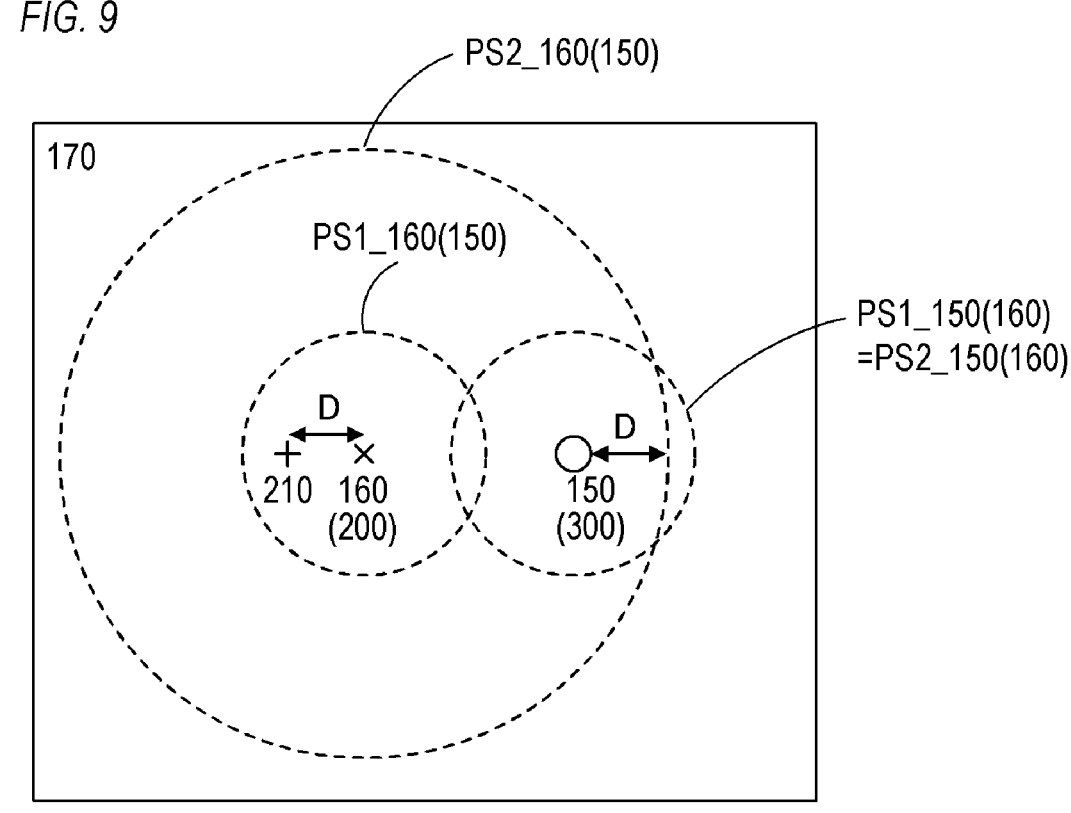
FIG. 9 is a schematic diagram illustrating personal space and the like according to the first embodiment.

A specific example of an operation (determination of a composite position) in a case where both the shortest allowable distance 1 and the shortest allowable distance 2 are used for intrusion determination will be described with reference to FIG. 9. A circle PS1_150 (160) centered on the person 150 is a circle having a radius of the shortest allowable distance 1 from the person 150 to the person 160, and a circle PS2_150 (160) centered on the person 150 is a circle having a radius of the shortest allowable distance 2 from the person 150 to the person 160. A circle PS1_160 (150) centered on the person 160 is a circle having a radius of the shortest allowable distance 1 from the person 160 to the person 150, and a circle PS2_160 (150) centered on the person 160 is a circle having a radius of the shortest allowable distance 2 from the person 160 to the person 150.

The person 150 sets the shortest allowable distance 1 (circle PS1_150 (160)) and the shortest allowable distance 2 (circle PS2_150 (160)) having the same length with respect to the person 160. Considering that the person 160 may approach the person 150 but does not want to be approached by the person 150, the shortest allowable distance 2 (PS2_160 (150)) longer than the shortest allowable distance 1 (PS1_160 (150)) is set for the person 150.

The person 150 designates a composite position of the person 160 set by the person 150, and sets the marker 200 at the composite position. The person 160 designates a composite position of the person 150 set by the person 160, and sets a marker 300 at the composite position.

In such a case, the marker 300 does not exist in the circle PS1_160 (150) centered on the person 160, and the person 160 does not exist in the circle PS2_150 (160) centered on the marker 300. Therefore, the position of the marker 300 is determined as the composite position of the person 150, and the person 150 is displayed at the position of the marker 300 on the display unit 127 of the HMD 120.

On the other hand, the marker 200 does not exist in the circle PS1_150 (160) centered on the person 150, but the person 150 exists in the circle PS2_160 (150) centered on the marker 200. Therefore, a position 210 at which the marker 200 is separated from the person 150 by the shortest distance D from the edge of the circle PS2_160 (150) to the person 150 is determined as the composite position of the person 160. Then, on the display unit 117 of the HMD 110, the person 160 is displayed at the new composite position 210. This can prevent the person 150 from intruding the personal space of the person 160.

Second Embodiment

Hereinafter, a second embodiment of the present invention will be described. In the following description, the same description as in the first embodiment (for example, the description about the same configuration and processing as in the first embodiment) will be omitted, and the difference between the first embodiment and the second embodiment will be described.

Figure 10:
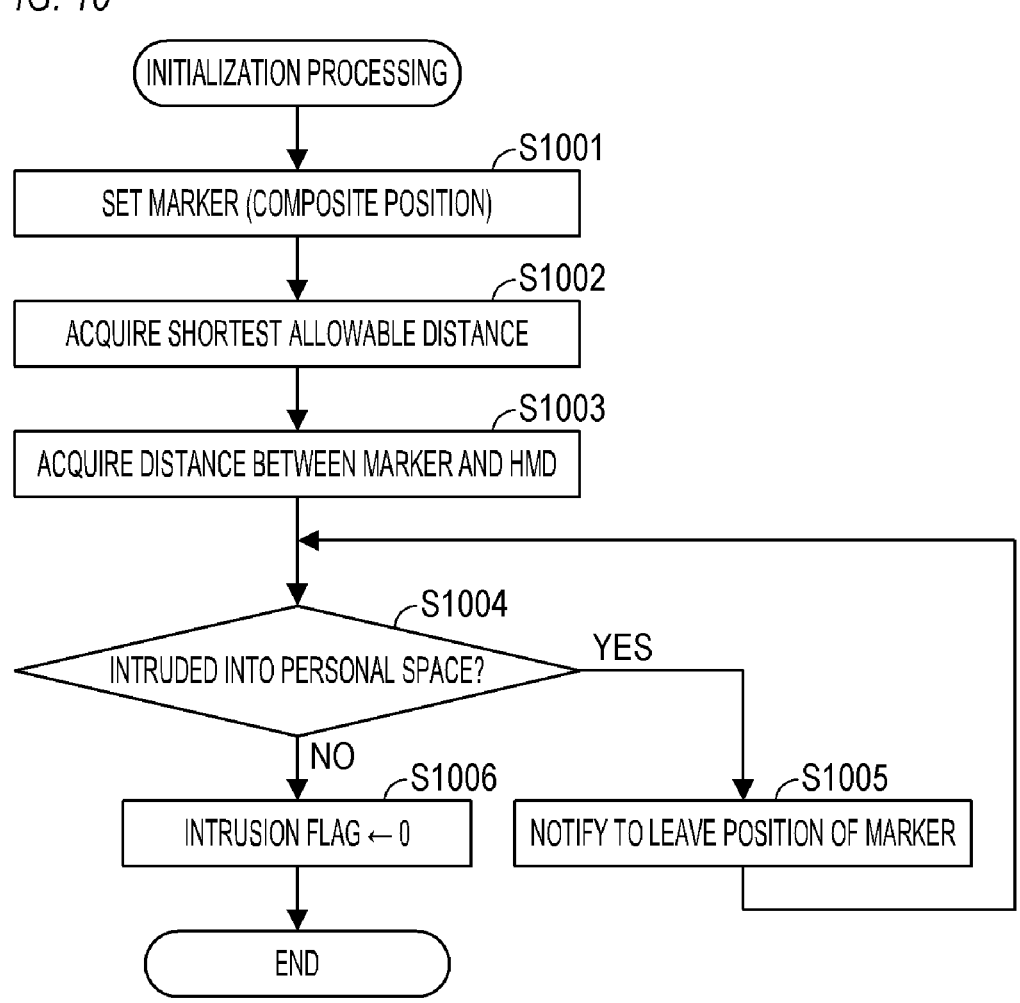
FIG. 10 is a flowchart illustrating initialization processing according to a second embodiment.

FIG. 10 is a flowchart illustrating initialization processing (S402 of FIG. 4) according to the second embodiment. The processing of S1001 to S1004 and S1006 is similar to the processing of S501 to S504 and S507 in FIG. 5. When it is determined in S1004 that intrusion into the personal space occurs, the processing in S1005 is performed.

In S1005, the CPU 111 of the host-side HMD 110 issues a notification (warning) to the host-side person 150 to urge the host-side person 150 to leave the position of the marker set in S1001. The notification method is not particularly limited, but for example, the CPU 111 displays a warning message on the display unit 117 of the host-side HMD 110. Until the host-side person 150 moves to a position where no intrusion into the personal space occurs, the initialization processing is not terminated and the notification continues. Then, when the host-side person 150 moves to a position where intrusion into the personal space does not occur, the processing of S1006 is performed.

In addition, in S502, the CPU 121 of the guest-side HMD 120 performs the processing in which the "host-side" of the above-described processing of the host-side HMD 110 is replaced with the "guest-side" and the "guest-side" is replaced with the "host-side".

According to the second embodiment, in a case where the distance from the first user to the display position of the second user is equal to or longer than the shortest allowable distance of the second user, the predetermined notification is given to the first user. Then, when the distance from the first user to the display position of the second user is equal to or longer than the shortest allowable distance of the second user, the second user is displayed at the display position. By doing so, it is possible to suppress intrusion into a personal space in a virtual world by a method different from that of the first embodiment.

The above-described embodiments (including the modifications) are merely examples, and a configuration obtained by appropriately modifying or changing any of the configurations of the above-described embodiments within the scope of the gist of the present invention is also included in the present invention. A configuration obtained by appropriately combining the configurations of the above-described embodiments is also included in the present invention.

For example, while the example using a video see-through HMD has been described, an optical see-through HMD may be used. The optical see-through HMD may or may not include an imaging unit for acquiring a field-of-view image. In addition, the guest-side HMD 120 may perform processing similar to the host-side display processing (FIG. 6). As a result, the guest-side person 160 can feel as if the host-side person 150 is in the same guest-side space 180 where the guest-side person 160 exists. Furthermore, although the example of displaying the image obtained by imaging the person has been described, an image corresponding to the person such as an avatar of the person may be displayed.

In addition, at least a part of the above-described processing performed by the HMD may be performed by an information processing apparatus other than the HMD, and the apparatus to which the present invention is applied does not need to be an HMD. For example, the present invention may be applied to an information processing apparatus that includes no display unit, such as a personal computer connected to an HMD. The present invention may be applied to a cloud server provided on the network 190.

In addition, although an example of using a mixed reality (MR) technology has been described, the present invention is also applicable to a case of using other cross reality (XR) technologies. For example, the present invention is also applicable to a case where an augmented reality (AR) technology is used, and the present invention is also applicable to a case where a virtual reality (VR) technology is used.

According to the present invention, it is possible to suppress intrusion into a personal space in a virtual world.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-067721, filed on Apr. 18, 2023, which is hereby incorporated by reference herein in its entirety.

What is claimed is:

1. An information processing apparatus comprising:
a processor; and
a memory storing a program which, when executed by the processor, causes the information processing apparatus to:
(1) acquire information regarding a personal space of a second user displayed in a three-dimensional space viewed by a first user;
(2) set, as a display position of the second user, a position in the three-dimensional space designated by the first user;
(3) acquire information regarding a distance from the first user to the display position of the second user in the three-dimensional space; and
(4) determine whether to display the second user at the display position so that the first user does not enter the personal space, on a basis of the personal space and the distance.

2. The information processing apparatus according to claim 1, wherein in a case where, with the second user being displayed at a first display position, it is determined that the first user does not enter the personal space on a basis of the personal space and the distance, the display position of the second user is maintained at the first display position, and wherein in a case where, with the second user being displayed at the first display position, it is determined that the first user enters the personal space on a basis of the personal space and the distance, the display position of the second user is updated from the first display position to a second display position such that it is determined that the first user does not enter the personal space.

3. The information processing apparatus according to claim 2, wherein control is performed to inquire the second user about whether or not the first user is allowed to enter the personal space in a case where, with the second user being displayed at the first display position, it is determined that the first user enters the personal space on a basis of the personal space and the distance, wherein control is performed to display the second user at the first display position in a case where the second user allows the first user to enter the personal space, and wherein control is performed to display the second user at the second display position in a case where the second user does not allow the first user to enter the personal space.

4. The information processing apparatus according to claim 1, wherein control is performed to issue a notification urging the first user to leave the display position in a case where it is determined that the first user enters the personal space on a basis of the personal space and the distance, and wherein control is performed to display the second user at the display position in a case where it is determined that the first user does not enter the personal space on a basis of the personal space and the distance.

5. The information processing apparatus according to claim 1, wherein control is performed to display the personal space in the three-dimensional space.

6. The information processing apparatus according to claim 1, wherein control is performed so as to output, to outside of the information processing apparatus, information regarding a personal space of the first user, and wherein the personal space of the first user is updated in response to an instruction from the first user.

7. The information processing apparatus according to claim 1, wherein an information processing apparatus of the second user performs control to display the first user in a three-dimensional space viewed by the second user, and wherein a sense of distance to the displayed second user obtained by the first user and a sense of distance to the displayed first user obtained by the second user are different from each other.

8. An information processing method comprising:

acquiring information regarding a personal space of a second user displayed in a three-dimensional space viewed by a first user;

setting, as a display position of the second user, a position in the three-dimensional space designated by the first user;

acquiring information regarding a distance from the first user to the display position of the second user in the three-dimensional space; and determining whether to display the second user at the display position so that the first user does not enter the personal space, on a basis of the personal space and the distance.

9. A non-transitory computer-readable medium that stores a program, wherein the program causes a computer to execute an information processing method comprising:

acquiring information regarding a personal space of a second user displayed in a three-dimensional space viewed by a first user;

setting, as a display position of the second user, a position in the three-dimensional space designated by the first user;

acquiring information regarding a distance from the first user to the display position of the second user in the three-dimensional space; and determining whether to display the second user at the display position so that the first user does not enter the personal space, on a basis of the personal space and the distance.

* * * * *